United States Patent Office 2,807,978
Patented Oct. 1, 1957

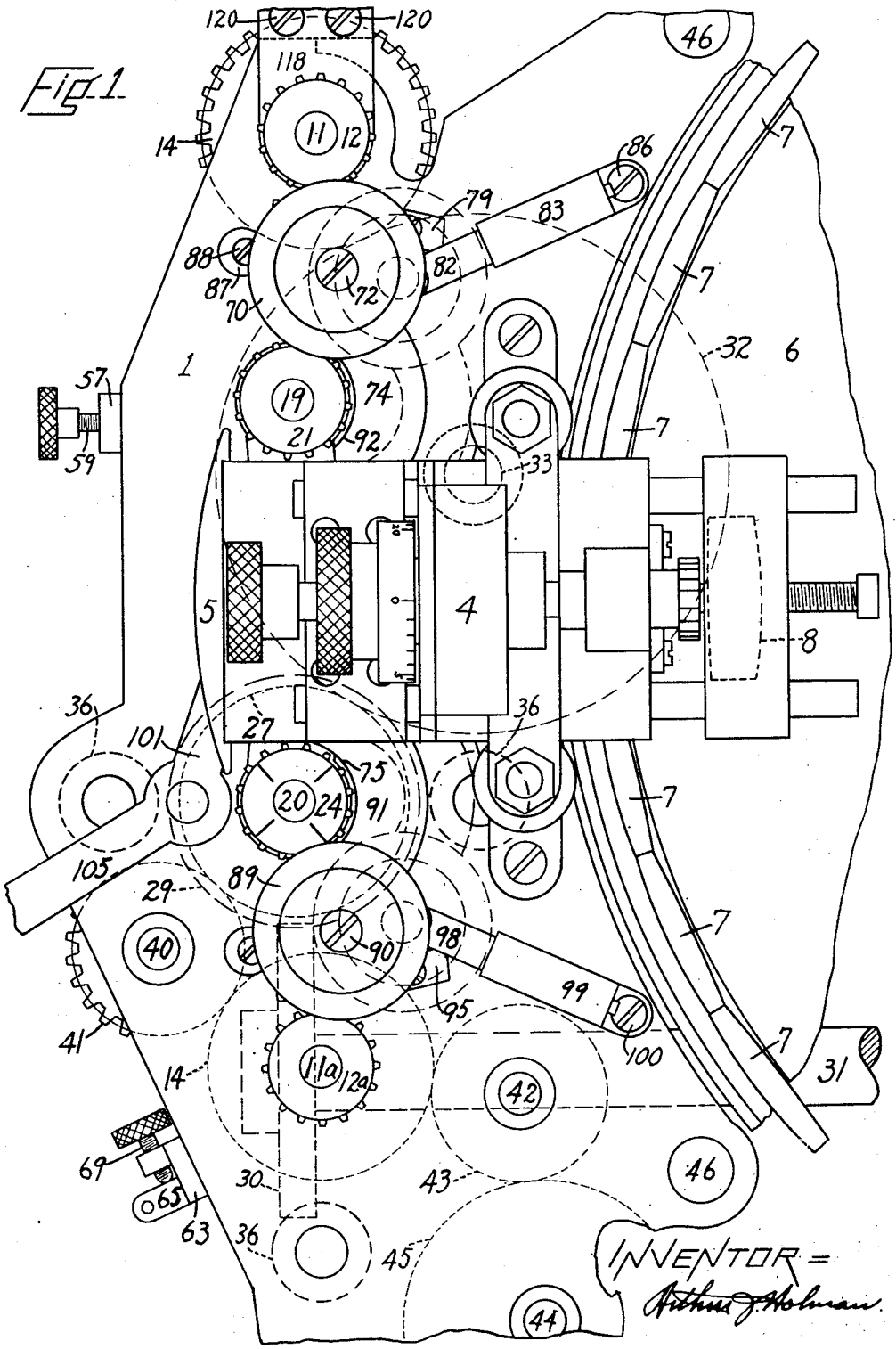

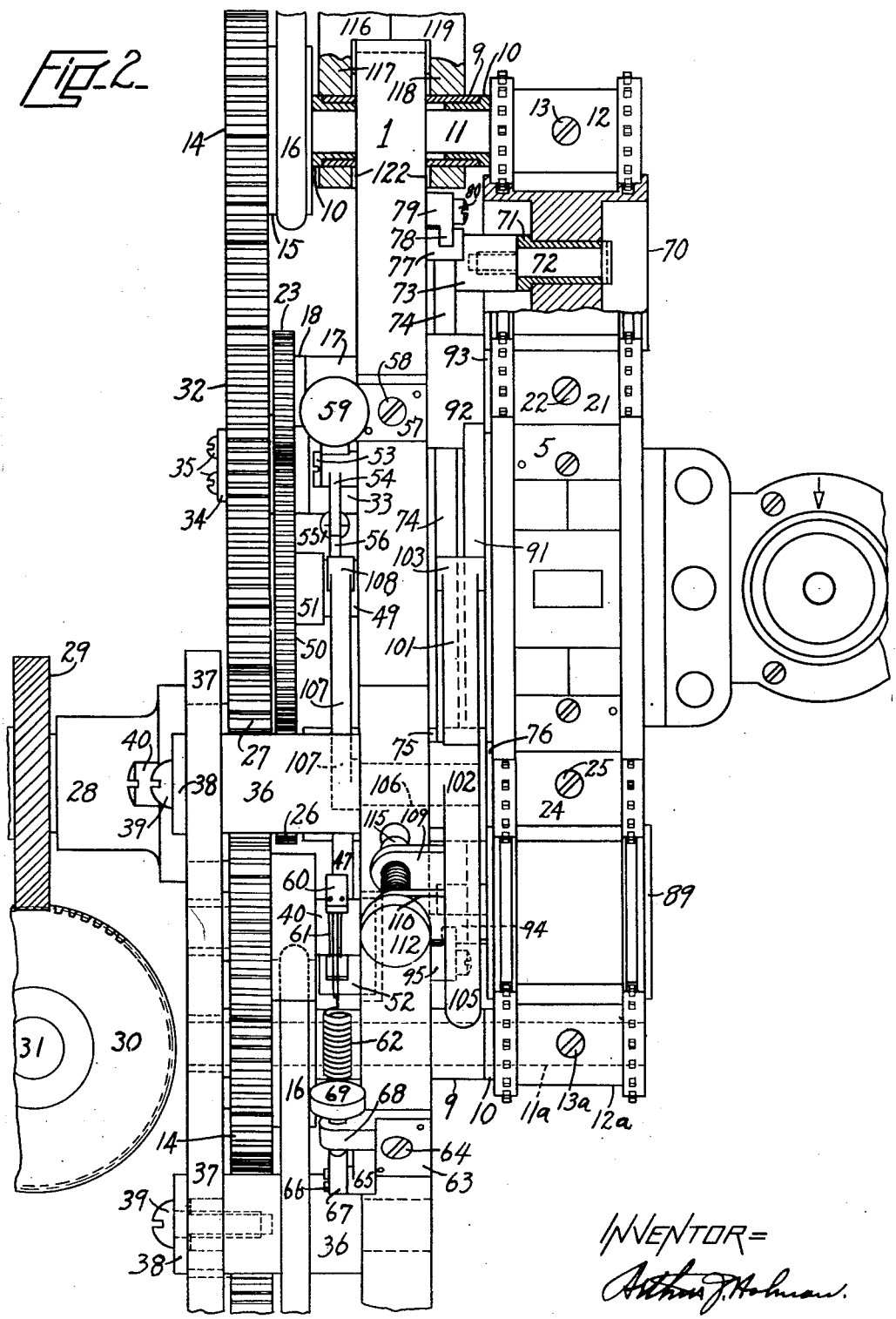

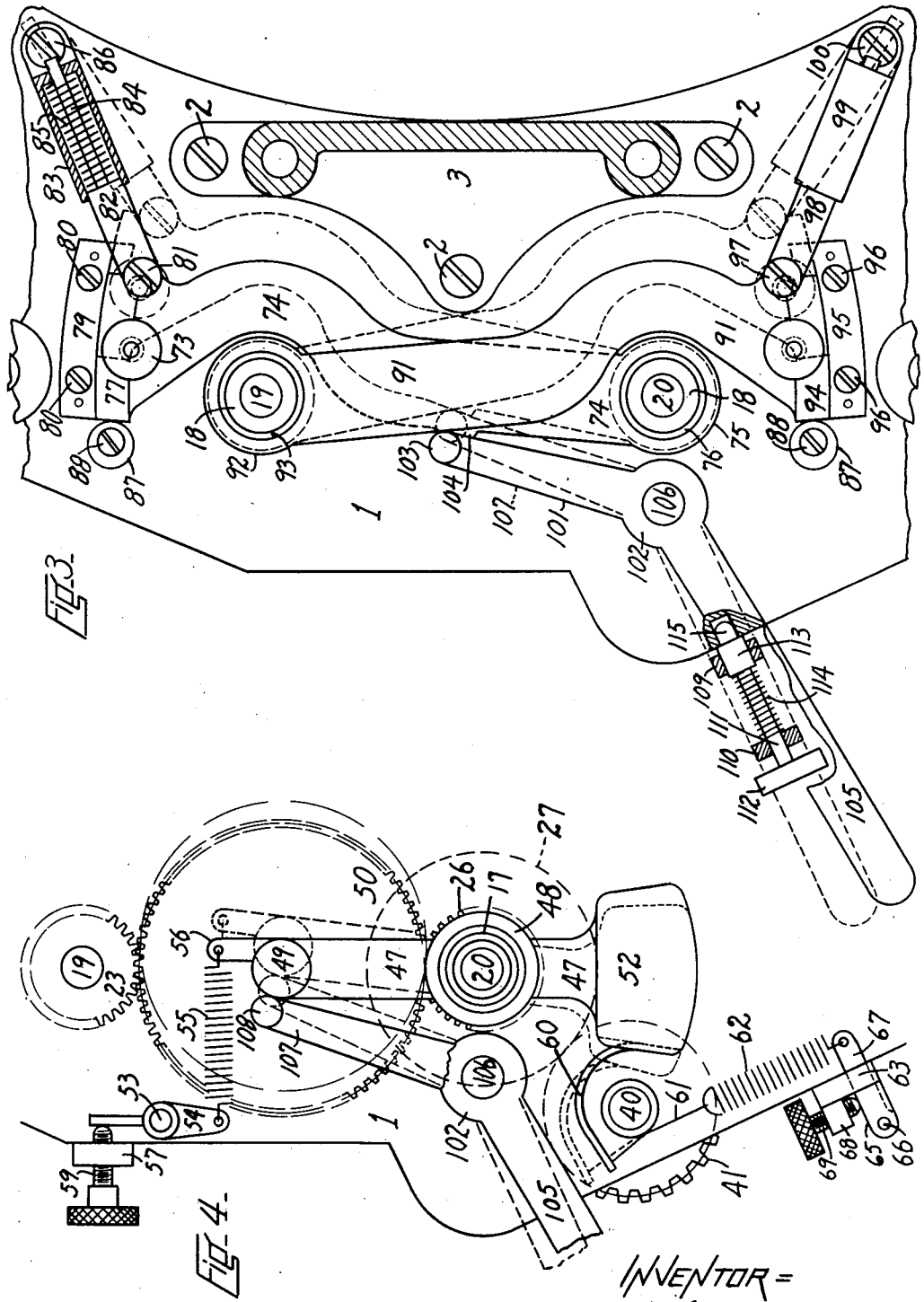

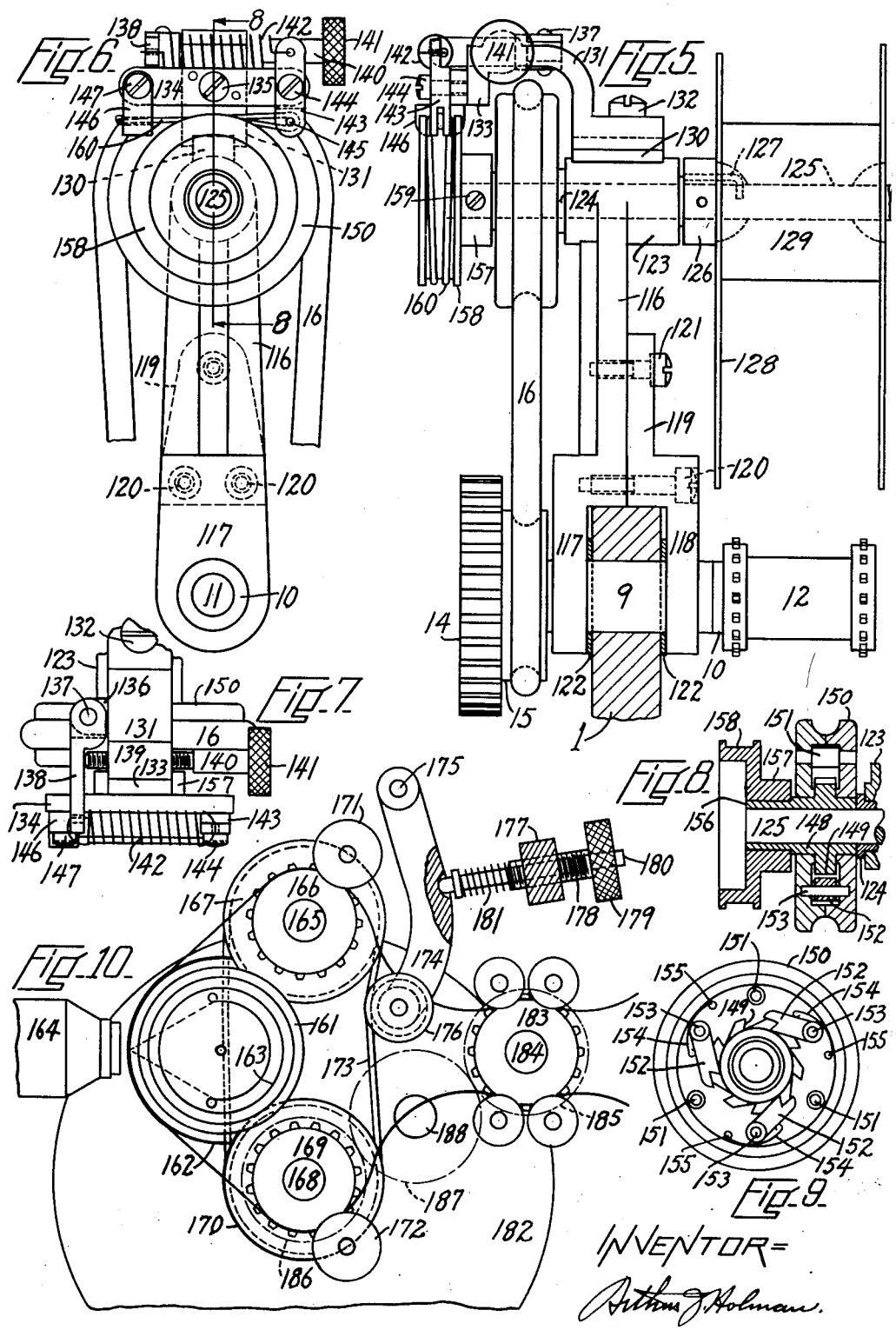

2,807,978

FILM FEEDING MECHANISM FOR OPTICAL RECTIFYING PROJECTORS AND CAMERAS AND FOR SOUND HEADS

Arthur J. Holman, Brighton, N. Y.

Application November 18, 1950, Serial No. 196,490

13 Claims. (Cl. 88—16.3)

My invention relates to film feeding mechanisms for motion picture projectors, cameras, film assessors, television film scanners, kinescope recording cameras and such apparatus, wherein the film is moved continuously over the picture aperture plate and the image rays are subjected to optical rectification as they pass through the objective system. My present device is designed to feed film over apertures in cameras, flying spot television film scanners, and also in projectors, television film scanners and film assessors wherein full illumination from the light source is applied continuously without damage to film left standing for long periods on the aperture plate. The present mechanism for feeding film over an aperture unit, in a device requiring no fire shutter, performs the function of a film movement stabilizer in much the same manner, namely, by tensioning film between two film sprockets, as is described in my Letters Patent of the United States, No. 2,280,825, issued April 28, 1942, for Combined Fire Shutter Automatic Control and Film Movement Stabilizing Device. The present aperture film feeding mechanism is suitable for feeding film continuously over a combined sound and picture aperture unit, and over either a picture or a sound aperture separately. It is designed to actuate film continuously, at any speed from 0 to 30 frames per second, in either direction, over the aperture unit in a film assessor or other device for analyzing motion in pictures at reduced speed in normal or reverse sequence. In addition to the improved aperture film feeding mechanism, this invention includes combined automatic loop setting and sprocket idler roller operating mechanism, film sprockets for maintaining film loops above and below the aperture unit, and feed and take up reel mechanism suitable for operating film in either direction over the aperture unit.

My device is effective as a stabilizer of film movement over an aperture unit because it applies forces to the film only by means of the teeth on two film sprockets, one sprocket positioned immediately above and the other immediately below the aperture unit. These sprockets tension the film overlying the curved aperture plate and thus cause the film to conform exactly to the convexedly curved hardened steel runners on the aperture plate, thereby rendering unnecessary the usual aperture film trap including tension shoes, springs etc., required in projectors wherein the film must move intermittently at the picture aperture. The two principal forces acting upon the film overlying the aperture unit, are opposite in direction, substantially equal in magnitude, and they are applied to the film in identical manner, i. e., by sprocket teeth; as a result, film movement over the aperture unit is uniformly smooth, as the sprockets rotate.

The principal object of this invention is to stabilize film movement by tensioning uniformly, between two film sprockets, that portion of film overlying a picture aperture unit, as film is drawn thereover by rotating these sprockets at any speed from zero to normal projection speed and in either forward or reverse direction. Another object is to provide simple and effective mechanism for adjustably tensioning the film between the two sprockets as the film is actuated, in either direction, over the aperture plate. Another object is to provide means for tensioning the film overlying the aperture plate after the film has been threaded loosely over the aperture sprockets and over the feed and hold back sprockets. A further object is to provide a combined automatic loop setting and sprocket idler roller operating mechanism for all film sprockets, which operates as a unit in connection with the aperture film tensioning device. A further object is to provide means for operating feed and take up reel shafts, in one direction, to feed film from the reel to the projector, and in the reverse direction, to wind film on the reel as it comes from the projector, thus permitting passage of film over the aperture unit in either direction and at any number of frames per second from 0 to 30. Other objects of this invention will appear in the description hereinafter.

To thread film through my device, a single control arm is moved manually to threading position, which operation frees all sprockets of idler rollers and rotates slightly, through differential means, one aperture sprocket relative to the other so film can be placed loosely over the teeth on all sprockets and over the two sprocket idler rollers, the latter being in correct position to set film loops to the desired size. After film has been threaded loosely over all sprockets and in engagement with teeth thereon, the control arm is released and this operation returns sprocket idler rollers into engagement with film sprockets and also tensions, properly, the film overlying the aperture plate.

The present device, designed primarily to meet requirements for assessing radar scope recordings on film, is a brand new film feeding mechanism for use in combination with the revolving lens wheel optical rectifying system and its associated shrinkage adjusting, focusing and masking unit, all as described in my copending patent application Serial No. 175,816, filed July 25, 1950, now Patent No. 2,713,285, for Film Shrinkage Adjusting, Focusing and Masking Unit for Revolving Lens Wheel System. This combination is especially well suited for use in studying any and all motion or action as recorded sequentially, on motion picture film: it is an excellent research tool for analysis of film recordings of extremely rapid motion or transient phenomena. This aperture film feeding mechanism in combination with the revolving lens wheel optical rectifying system, is also useful in cameras; the reversing film feeding feature is of special value in trick photography. The paired sprocket aperture film feeding mechanism is of great value for stabilizing film movement through sound pick up and sound recording devices. This film feeding mechanism is new in optical rectifiers and its advantages and uses will be further discussed hereinafter.

My device may be best understood by reference to the accompanying drawings in which:

Fig. 1 is a side elevation of my device showing its position, in the projector mechanism, with respect to the revolving lens wheel and the film shrinkage adjusting, focusing and masking unit.

Fig. 2 is a rear elevation of the same minus the lens wheel and its supporting structures.

Fig. 3 is a side elevation of part of my device with the film shrinkage adjusting, focusing and masking unit removed to show the idler roller supporting structures and their operating mechanism.

Fig. 4 is a schematic side elevation showing the tensioning and reversible film feeding mechanism for controlling the movement of film over the picture aperture plate.

Fig. 5 is an elevation of a feed (hold back) sprocket, its associated film reel, and mechanism to (1) provide a drag on the reel when film is being drawn therefrom by the feed sprocket and (2) drive the reel to take up film as it comes from the hold back sprocket.

Fig. 6 is an end elevation of the same with the driving gear and pulley removed from the sprocket shaft to show the reel shaft supporting bracket.

Fig. 7 is a top view of the reel shaft control mechanism showing the spring and adjustable tensioning means for controlling the drag on the reel shaft.

Fig. 8 is a cross section through the drag pulley and the ratchet pulley on line 8—8 of Fig. 6.

Fig. 9 is a view of the ratchet mechanism as it appears with one of the halves of the ratchet pulley removed.

Fig. 10 is a schematic view showing the arrangement of the essential film feeding elements in an optical sound pick up unit.

Referring now more particularly to the drawings, 1 is the main frame of the projector mechanism to which is secured by dowel screws 2 (Fig. 3) the base member 3 which supports the film shrinkage adjusting, focusing and masking unit 4, carrying aperture plate 5 (Fig. 1), as fully described in my copending patent application Serial No. 175,816, hereinbefore referred to. Revolving lens wheel 6 suitably supported for rotation and positioned with respect to main frame 1 as shown in Fig. 1, carries fixedly mounted on its periphery lens elements 7 which form a complete ring of lenses; i. e., the ring is all glass and the lens elements are not separated by opaque material. As lens wheel 6 rotates, each lens element 7 functions, in turn, as rear component of the optical rectifying objective, the front component 8 of which is carried on the focusing mount of the film shrinkage adjusting, focusing and masking unit 4, as fully described in copending patent application Serial No. 175,816. Optical characteristics of the shutter free revolving lens wheel optical rectifying objective, including front component 8 and rear components 7, are fully described in Letters Patent of the United States No. 2,410,069, issued October 29, 1946, for Objective for Projection, Photography, Television, and for Telescope.

The manner in which this 100 percent shutter free optical rectifying objective coacts with my film shrinkage adjusting, focusing and masking unit, is fully described in copending patent application Serial No. 175,816. When these inventions are combined with the present improved film feeding mechanism, there results an ideal instrument for film assessing, for projection and for television film scanning. In suitably modified form, this combination makes an ideal motion picture camera and kinescope recording camera. Since the system is 100 percent shutter free, it is the perfect instrument for kinescope recording and for television film scanning; it may be operated at any desired film frame rate per second because it operates successfully without being synchronized with television scanning circuits.

My aperture film movement stabilizer and film feeding mechanism actuates the film by means of four film sprockets, two of which control the movement of and the tension on the film as it passes over the hardened steel curved film runners on the aperture plate; the other two sprockets, each acting either as feed or hold back sprocket, depending on the direction in which film is travelling through the projector mechanism, serve to maintain free loops in the film above and below the aperture unit.

Two identical steel bushings 9 are press fitted in suitable bores in main frame 1, and in the ends thereof are press fitted oilite bearings 10 wherein are journaled upper feed (hold back) and lower hold back (feed) sprocket shafts 11 and 11a, respectively. Film sprockets 12 and 12a are a light press fit on shafts 11 and 11a, respectively, and are secured on one end of each of these shafts by set screws 13 and 13a, respectively. On the opposite ends of shafts 11 and 11a are mounted identical non-metallic drive gears 14, the hubs 15 whereof each contain an annular groove and act as pulleys for take up belts 16. A second pair of steel bushings 17 (Figs. 2 and 4) somewhat longer than steel bushings 9, are press fitted in suitable bores in main frame 1, and in the ends thereof are press fitted oilite bearings 18 wherein are journaled aperture sprocket shafts 19 and 20, the one above and the other below the aperture unit. To secure exact alignment of all film sprockets, steel bushings 9 and 17 all project exactly the same distance from that side of main frame 1 adjacent to which the film sprockets are mounted. Aperture sprocket 21 is a light press fit on one end of shaft 19 and is further secured thereon by set screw 22, and on the other end of shaft 19 is press fitted gear 23. Aperture sprocket shaft 20 carries, lightly press fitted on one end, aperture sprocket 24 which is further secured thereon by set screw 25. The exposed end of sprocket 24 is marked (Fig. 1) with four equally spaced radial lines which correspond, in spacing, with frame lines on the film. Sprocket shaft 20 carries press fitted thereon a gear 26 in alignment with gear 23 on shaft 19, and also a non-metallic drive gear 27 in line with gears 14 on shafts 11 and 11a. Gear 27 is secured on shaft 20 by a suitable set screw (not shown). Sprocket shaft 20, extending through bearing bracket 28 wherein it is journaled in a suitable oilite bearing, carries fixedly mounted on its end, helical gear 29. Helical gear 29 meshes with helical gear 30 secured on one end of lens wheel driving shaft 31, which is journaled in bearing brackets suitably supported from main frame 1. The balance (not shown) of the gear train which serves to drive the lens wheel from aperture film sprocket shaft 20, comprises a pair of mating helical gears, one of which is secured on the other end of lens wheel driving shaft 31 and the other is mounted directly on the lens wheel shaft.

An idler gear 32 having an oilite bearing bushing press fitted in the bore in its hub, is journaled on a stud 33 fixed in and projecting from main frame 1 so idler gear 32 is in alignment and meshes accurately with non-metallic drive gear 14 on upper sprocket shaft 11 and with non-metallic gear 27 fixed on lower aperture sprocket shaft 20. A circular plate 34 secured to the end of stud 33 by screws 35 keeps gear 32 on stud 33. Idler gear 32, with its meshing gears 14 and 27, serves to drive upper feed (hold back) sprocket 12 and also upper take up belt 16, from the lower sprocket shaft 20.

Three frame spacing studs 36, each having one end of reduced diameter press fitted in a bore in main frame 1, project from main frame 1 and support bearing plate 37 which fits accurately on the outer ends of studs 36, also of reduced diameter, and is retained thereon by washers 38 and screws 39. Bearing bracket 28 which journals sprocket shaft 20, is secured to bearing plate 37 by two screws 40. One end of lower hold back (feed) sprocket shaft 11a is journaled in an oilite bearing press fitted in bearing plate 37. A shaft 40 is journaled at one end in an oilite bearing press fitted in main frame 1 and at the other end, in an oilite bearing press fitted in bearing plate 37. A gear 41 is press fitted on shaft 40 and positioned to be in alignment and to mesh accurately with gear 27 on aperture sprocket shaft 20 and with gear 14 on lower hold back (feed) sprocket shaft 11a. A shaft 42, journaled in oilite bearings in main frame 1 and in bearing plate 37, carries press fitted thereon, gear 43 in alignment and meshing with gear 14 on lower hold back (feed) sprocket shaft 11a. A shaft 44, similarly journaled, carries set screwed thereon non-metallic gear 45 in alignment and meshing with gear 43. A gear (not shown) like gear 45 is set screwed on the outboard end of shaft 44 and meshes with a large diameter gear (not shown) on a shaft provided with a hand crank by means of which all film sprockets may be rotated simultaneously, in either direction and at any desired speed. Operation of the hand crank moves film frames over the aperture plate in synchronism with the passage of lens elements 7 across the optical axis of front component 8 as lens wheel 6 is rotated by the gear train hereinbefore described.

Main frame 1 of the projector mechanism is supported within the housing (not shown) of the radar film assessor on two through studs 46 which are secured in bores in main frame 1.

Actuating film under tension, in either direction, over the aperture plate of a revolving lens wheel projector, presents a problem requiring the development of new mechanism for its successful solution. Moving film under tension, in one direction, over an aperture plate by means of two aperture film sprockets, is easily accomplished by applying, in some suitable manner, a drag load on one of the film sprockets. But, when moving film over an aperture plate in the reverse direction, the sprocket formerly acting as drag sprocket to provide tension on the film, must then act as the drive sprocket to move film in the reverse direction while the former drive sprocket must function as drag sprocket to tension the film. In other words, the actuating mechanism functioning between the two aperture film sprockets, must be capable of operating either sprocket as a drive sprocket while the other acts to tension the film overlying the aperture plate. For the purpose of radar film assessing and also for analyzing other technical action films, it is essential that tension on the film overlying the aperture plate of the revolving lens wheel projector be substantially constant at all times regardless of whether the film is stationary or moving in either direction at speeds up to 30 frames per second. The mechanism now to be described has been found highly satisfactory for this purpose.

An arm 47 (Fig. 4) has a hub 48 into which is press fitted an oilite bearing which fits freely, but with minimum clearance, on that portion of steel bushing 17 which projects from the left side of main frame 1, as shown in Fig. 2. The upper end of arm 47 carries integral cylindrical boss 49 wherein is screwed a stud (not shown) whereon is journaled gear 50, the hub 51 of which is bushed with a suitable oilite bearing. The head of this stud shoulders against the end of the oilite bearing in hub 51 thus retaining gear 50 in alignment with and in meshing engagement with gear 23 on upper aperture sprocket shaft 19 and with gear 26 on lower aperture sprocket shaft 20. The lower end of arm 47 is provided with an integral counter weight 52 which exactly balances arm 47, together with gear 50, about the axis of lower aperture sprocket shaft 20. That is to say, there is no gravitational force tending to swing arm 47 about the axis of shaft 20 whether the film feeding mechanism is mounted in a vertical position as shown, or at some angle to the vertical.

It will be observed that, if gear 26 on shaft 20 is prevented from turning, and arm 47 is moved slightly in a clockwise direction (Fig. 4), gear 23 and upper aperture sprocket shaft 19 will be rotated counterclockwise: i. e., such swinging movement of arm 47 about the axis of shaft 20 causes gear 50 to act as a differential between gears 23 and 26 and results in an angular displacement of gear 23 with respect to gear 26. This means that the distance, along the film path over the aperture plate, beteween the teeth on lower aperture film sprocket 24 and the teeth on upper aperture film sprocket 23, is reduced by swinging the arm 47 in a clockwise direction. Therefore, with arm 47 swung clockwise to the dotted position shown in Fig. 4, thus bringing gear 50 to the position indicated by the broken pitch circle, film may be threaded loosely over the aperture plate 5 and in engagement with the teeth on aperture film sprockets 21 and 24. As arm 47 is swung counterclockwise from this position, the slack in the film beteween sprockets 21 and 24 will be taken up, and any additional force applied to swing arm 47 further in a counterclockwise direction will create tension in the film overlying the aperture plate, the tension being proportional to the force applied. Tension in the film overlying the aperture plate is provided in the following manner: A hinge stud 53, having a threaded end portion, is screwed into a threaded hole in main frame 1 (Figs. 2 and 4) and on this stud is mounted swinging bracket 54, the lower end of which is drilled to receive one end of coiled tension spring 55, the other end of which is secured to a lug 56 integral with arm 47 and projecting above cylindrical boss 49 thereon. A bracket 57 secured to main frame 1 by screw 58 and aligned thereon by suitable dowel pins, has an overhung portion containing a tapped hole to take adjusting screw 59, the free end of which bears against the upper portion of swinging bracket 54. Turning adjusting screw 59 by means of its knurled head will increase or decrease the pull of spring 55 and thus regulate the tension on the film overlying the aperture plate. The tension on the film overlying the aperture plate, is determined by the net force acting to swing arm 47 in a counterclockwise direction, as viewed in Fig. 4. This holds true whether film is moving in either direction, or is stationary on the aperture plate 5.

When film is stationary on the aperture plate, the only force acting to tension the film between aperture sprockets 21 and 24 is that exerted by the coiled tension springs 55. When film is moving downwardly over the aperture plate, upper aperture film sprocket 21 acts as the drag sprocket and hence sprocket 21 is actually driven by the pull applied to the film by lower aperture sprocket 24, therefore gear 23 fixed on upper aperture sprocket shaft 19 applies some driving force to gear 50. This action produces a small force tending to swing arm 47 in a clockwise direction but its effect is so slight that tension on the film overlying the aperture plate is not materially reduced thereby; its effect may be neutralized by increasing slightly the tension on spring 55.

When film is moving upwardly over the aperture plate, upper aperture film sprocket 21 acts as the film driving sprocket and hence must be driven through gear 50. When film moves upwardly over the aperture plate, film sprocket 21 is rotating clockwise, gear 23 is rotating in the same direction, and gear 50 is rotating counterclockwise and applying pressure to teeth on gear 23 in the direction from right to left as viewed in Fig. 4. Gear 26, on lower aperture sprocket shaft 20, in driving gear 50, applies pressure on the teeth of gear 50 in the direction from left to right, as viewed in Fig. 4. Thus, the driving force exerted by gear 50 on gear 23 and the driving force exerted by gear 26 on gear 50 are cumulative in their effect in swinging arm 47 in a clockwise direction about the axis of lower aperture sprocket shaft 20. The cumulative force acting to swing arm 47 clockwise, when film is moving upwardly over the aperture plate, is several times greater than the force acting in this direction when film is moving downwardly over the aperture plate. This force must be neutralized by means other than tension spring 55 in order to maintain, automatically, substantially constant tension on the film overlying the aperture plate when film is moving in either direction thereover. The desired result is obtained in the following manner: A curved arm 60 secured to the side of counterweight 52 on arm 47, overhangs shaft 40 and contains two holes near its free end through which are threaded and tied together the two ends of a string to form a loop 61. The string is composed of material suitable to function as a friction band and the loop is just long enough to go once around shaft 40 and extend slightly below shaft 40 where the loop is attached to one end of coiled tension spring 62. The loop is threaded around shaft 40 in such manner that the end to which the spring is attached comes away from shaft 40 between the two sides of the loop tied to arm 60, as shown in Fig. 2. A bracket 63 (Figs. 2 and 4) secured to main frame 1 by screw 64 and aligned thereon by suitable dowel pins, has an integral boss 65 which is drilled and tapped to receive hinge screw 66 whereon is hingedly mounted arm 67, the free end of which is drilled to receive the other end of coiled tension spring 62. An overhung portion 68 on bracket 63 is drilled and tapped to receive adjusting screw 69, the end of which engages the side of arm 67. Turning adjusting screw 69 by means of its knurled head regulates the pull of spring 62 on the spring attached end of loop 61.

When film is moving upwardly over the aperture plate, the lower aperture film sprocket is rotating in a clockwise direction as is gear 27 which is fixed on shaft 20, and gear 41 which drives gear 27, is rotating counterclockwise as is shaft 40 whereon gear 41 is mounted. When rotating counterclockwise shaft 40, acting on the friction bands comprising loop 61, functions as a one way force multiplier and exerts a pull, through loop 61, on curved arm 60 which is several times greater than the pull of tension spring 62 on the loop 61. Thus a very slight pull, say a fraction of an ounce, exerted by spring 62 on the end of loop 61 is sufficient to neutralize the cumulative forces, hereinbefore described, which tend to swing arm 47 in a clockwise direction thereby reducing the tension on film overlying the aperture plate when film is moving upwardly thereover. When film is moving downwardly over the aperture plate, shaft 40 is rotating clockwise and the pull multiplying effect of the friction bands is reversed, therefore the pull of loop 61 on curved arm 60, under this condition, is only a very small fraction of the pull of tension spring 62 on the loop 61. Thus shaft 40, rotating within the friction bands, acts effectively as a one way force multiplier. When the tension on spring 62 has been properly adjusted by means of adjusting screw 69, the forces tending to swing arm 47 clockwise about the axis of lower aperture sprocket shaft 20 will have been neutralized for either direction of movement of film over the aperture plate, and the actual tension on the film overlying the aperture plate, for all conditions of film movement, may then be set to any desired value by operating adjusting screw 59.

Film is retained in engagement with teeth on upper feed (hold back) sprocket 12 and on upper aperture sprocket 21 by idler roller 70 (Figs. 1 and 2) which is provided with integral side flanges to keep the film centered on the sprockets and is also provided with annular grooves so sprocket teeth will have clearance. An oilite bearing 71 press fitted in the bore in the hub of idler roller 70, is a close running fit on the ground cylindrical body of screw pin 72, the threaded end portion of which is screwed into a tapped hole in cylindrical boss 73 integral with idler roller supporting arm 74. The head on screw pin 72 abuts against the end of bearing 71 and retains idler roller 70 in proper alignment with sprockets 12 and 21. Idler roller supporting arm 74, curved at its upper mid portion to provide clearance about aperture sprocket shaft 19, terminates at its lower end, in cylindrical boss 75 which has press fitted in a bore therein, oilite bearing 76, the latter being a close turning fit on steel bushing 17 containing oilite bearing 18 wherein lower aperture sprocket shaft 20 is journaled. The upper end of idler roller supporting arm 74 carries integral therewith, ring segment 77 which is rectangular in cross section and has its center on the axis of lower aperture sprocket shaft 20. Within an annular groove in ring segment 77, which groove is concentric with shaft 20, is fitted with a close but freely sliding fit, the tongue 78 integral with oilite guide plate 79 which is aligned on and secured to main frame 1 by suitable dowel pins and screws 80. Within a tapped hole in a cylindrical boss on idler roller supporting arm 74 is screwed the threaded end portion of hinge screw 81 whereon is hingedly supported at one end plunger 82, the cylindrical body of which is a free sliding fit in the bore in cylinder 83. The longer end portion 84 of plunger 82 is of reduced diameter and slides freely through a bore in the head of cylinder 83, and a coiled compression spring 85 seats at one end against the shoulder on plunger 82 and at the other end against the head of cylinder 83. Cylinder 83 is hingedly connected, at its head end, to main frame 1 by hinge screw 86. An eccentric collar 87 on screw 88, which enters a tapped hole in main frame 1, provides adjustable stop means for limiting the movement of idler roller supporting arm 74 in a counterclockwise direction about the axis of sprocket shaft 20.

Film is retained in engagement with teeth on lower hold back (feed) sprocket 12a and on lower aperture sprocket 24 by idler roller 89 which is exactly like idler roller 70. Idler roller 89 with an oilite bearing press fitted in its bore, is journaled on screw pin 90 secured in a boss on idler roller supporting arm 91. Idler roller supporting arm 91 is similar in form to idler roller supporting arm 74, and terminates at its upper end, in cylindrical boss 92 which has press fitted in a bore therein, oilite bearing 93, the latter being a close turning fit on steel bushing 17 containing oilite bearing 18 wherein upper aperture sprocket shaft 19 is journaled. Idler roller supporting arm 91 is provided, at its lower end, with ring segment 94 having an annular groove concentric with shaft 19, wherein is fitted the tongue integral with oilite guide plate 95, the latter being aligned and secured to main frame 1 by dowel pins and screws 96. Hinge screw 97 hingedly connects one end of plunger 98 with idler roller supporting arm 91. Plunger 98 fits in a bore in cylinder 99 which contains a coiled compression spring just like spring 85 in cylinder 83. Cylinder 99 is hingedly connected, at its head end, to main frame 1 by hinge screw 100. An adjustable stop for limiting the clockwise movement of idler roller supporting arm 91 about the axis of sprocket shaft 19 is provided by eccentric collar 87 which is secured to main frame 1 in any required angular position by a screw 88.

From the foregoing description of the idler rollers and their supporting members, it is apparent that the axes of the idler rollers will always be and remain parallel to the axes of the film sprockets with which the idler rollers are associated and that the compression spring operated plungers and cylinders will act to move each idler roller toward its particular pair of film sprockets. The adjustable stops limiting the movement of idler roller supporting arms 74 and 91 are set, preferably, so the minimum clearance between the idler rollers and their respective sprockets is just sufficient to pass a film splice; i. e., the minimum clearance is equal to two thicknesses of film. This amount of clearance will provide satisfactory engagement of film with sprocket teeth and also permits passage of a film splice without causing lateral displacement of the idler rollers.

To facilitate the threading of film through this film feeding mechanism, two operations must be performed simultaneously, namely, the two idler rollers must be swung clear of their associated sprockets and the upper aperture film sprocket 21 must be rotated slightly counterclockwise with respect to lower aperture film sprocket 24. The idler roller supporting structures and the aperture sprocket differential drive mechanism, as hereinbefore described, provide the necessary freedom to permit the required movement of parts, and the change over from operating to threading and vice versa, is accomplished in the following manner: A control arm 101 (Figs. 2, 3 and 4) having cylindrical hub 102, terminates in cylindrical boss 103 which bears against the rearward edges of idler roller supporting arms 74 and 91 at a position approximately mid way between the upper and lower aperture sprocket shafts 19 and 20. The rearward edge of upper idler roller supporting arm 74 is provided with a small pad 104 set at an angle to contact cylindrical boss 103 on control arm 101 so that each idler roller will be displaced from its associated sprockets by the same amount, as control arm 101 is operated. Operating handle 105, integral with control arm 101, extends from hub 102 at an angle to arm 101 and projects beyond main frame 1 as shown in Fig. 3. A shaft 106 having integral control arm 107 terminating in cylindrical boss 108, is journaled in a bore in main frame 1 and is press fitted and pinned securely in a bore in hub 102 of control arm 101 in such position that control arm 107 lies directly behind control arm 101, as viewed in Fig. 3. Control arms 101 and 107 are of exactly the same length therefore cylindrical bosses 103 and 108 have a common axis when the control arms are assembled as described. Integral with operating handle 105 and projecting outwardly therefrom are bosses 109 and 110 and, in aligned bores therein, is slidably mounted plunger 111 provided at one end with finger grip 112. The enlarged portion 113 of plunger 111 slides through the bore in boss 109 and forms a shoulder against which is seated, at one end, coiled compression spring 114 which abuts at its other end against boss 110.

When operating handle 105 is moved to the position shown by broken lines in Figs. 3 and 4, the rounded end 115 (Fig. 3) on plunger 111 enters a bore in the edge of main frame 1 and its retained therein by compression spring 114, thus locking operating handle 105 and control arms 101 and 107 in the positions indicated by the broken lines. The act of moving operating handle 105 to this position causes, (1) control arm 101 to shift idler roller supporting arms to the positions indicated by the broken line in Fig. 3, thereby spacing idler rollers from their sprockets as shown by broken circles in Fig. 1; and (2) control arm 107 to shift arm 47 and gear 50 supported thereon, to the positions indicated by the broken lines in Fig. 4, thereby rotating upper aperture sprocket shaft 19 slightly counterclockwise thus reducing the length of path over the aperture plate between teeth on the aperture film sprockets. After film has been threaded over all four film sprockets and in engagement with sprocket teeth, a slight pull on finger grip 112 withdraws plunger 111 from the bore in main frame 1, then compression springs in the control cylinders return idler rollers to operating position, and spring 55 swings arm 47 counterclockwise to take up slack and tension film overlying the aperture plate. The film feeding mechanism is then ready for operation in either direction and at any speed up to 30 frames per second.

In order to feed film over the projector aperture plate in either direction, it is essential that either film reel may act as feed or take up reel depending on which way film is travlling through the mechanism. When a reel acts to take up film, the reel must, of course, be driven; when it acts to feed film, it should be provided with suitable drag means so film will not pile up ahead of the film feeding sprocket if projection is slowed or stopped suddenly. My device is arranged to fulfill these requirements in the following manner: Reel shaft bracket 116 (Figs. 5 and 6) has integral therewith one prong 117 of a two prong fork, the other prong 118 of which is integral with bracket 119, the latter being secured to bracket 116 by suitable dowel screws 120 and 121. Aligned bores in prongs 117 and 118 fit snugly on steel bushing 9 press fitted in the upper part of main frame 1 (Figs. 1 and 2). Between each of the prongs and main frame 1 is a friction washer 122 of just sufficient thickness to be under compression when brackets 116 and 119 are assembled and screwed together. The purpose of the friction washers is to retain the reel shaft bracket in operating position or in folded position within the radar film assessor casing when the assessor is not in use. Main frame 1 is notched out at its upper portion, as shown in Fig. 1, to permit reel shaft bracket 116 to be folded forward into the assessor case. The upper end of bracket 116 carries integral cylindrical boss 123 which has press fitted in a bore therein flanged oilite bearing 124 wherein is journaled reel shaft 125. A collar 126 (Fig. 5) sliding snugly on reel shaft 125 and pinned thereto, is drilled to take bent pin 127, one end of which enters a drilled hole in reel shaft 125. Film reel 128 is comprised of two side flanges suitably secured to a hub 129, and slots milled in each end of hub 129 may slide over bent pin 127 which serves to key reel 128 to reel shaft 125 when the reel is pushed all the way thereon. The reel may be secured in operating position by any of the usual means employed for the pupose.

A rectangular finished boss 130 on top of cylindrical boss 123 fits in a milled channel in the bottom of drag bracket 131 and serves to align it with reel shaft 125.

Drag bracket 131, secured in position by screw 132, bends through an angle of 90 degrees so its free end extends out over reel shaft 125. The end portion 133 on drag bracket 131 extends downwardly at right angles to reel shaft 125 and forms a seat for cross bar 134 which is aligned and held on drag bracket 131 by dowel pins and screw 135. A lug 136 (Fig. 7) integral with drag bracket 131, has press fitted in a bore therein a hinge pin 137 whereon may swing the arm 138 which extends, parallel to drag bracket 131, to a position beyond cross bar 134. A section of drag bracket 131 is expanded into cylindrical boss 139 and, in a threaded bore therein, is fitted drag adjusting screw 140, having knurled head 141. The end of adjusting screw 140 bears against swinging arm 138 and turning drag adjusting screw 140 varies the pull of coiled tension spring 142 which is hooked, at one end, through a hole in the end of arm 138 and is hooked at the other end through a hole in one end of link 143, the latter being swingably supported at one end of cross bar 134 on hinge screw 144. The lower end of link 143 is slotted and, through a bore therein, is press fitted a pin 145 (Fig. 6) which extends through the slot. A link 146 attached to the other end of cross bar 134 by screw 147, projects downwardly from cross bar 134 and has two holes drilled through its lower end opposite the position of pin 145 in the lower end of link 143.

An oilite hub 148 (Figs. 8 and 9), having integral ratchet teeth 149, is a snug sliding fit on reel shaft 125 and forms the journals whereon the two halves of ratchet pulley 150 may rotate. The two halves of ratchet pulley 150 are held together by three shouldered pins 151 which are a press fit in opposite bores in the pulley halves. Within the cavity in ratchet pulley 150 are hingedly mounted three pawls 152 on oilite studs 153, the latter being supported securely in blind holes in opposite faces of the halves of ratchet pulley 150. To keep the pawls in alignment with ratchet teeth 149 on hub 148, oilite washers (Figs. 8) are provided on oilite studs 153 to space the pawls from the internal walls of pulley 150. Pawl springs 154, supported at one end on pins 155 pressed in blind holes in the pulley halves, bear against pawls 152 and insure their engagement with ratchet teeth 149. After assembly of the ratchet parts and the halves of ratchet pulley 150 on oilite hub 148, the ends of shouldered pins 151 are prick punched to hold the unit firmly together.

A portion 156, of somewhat smaller diameter, integral with oilite hub 148 and extending beyond ratchet pulley 150, is a light press fit in the bore in the hub 157 of flanged drag pulley 158. A dowel set screw 159, fitted in a threaded bore in the hub of drag pulley 158, is a good fit in an aligned bore in portion 156 of oilite hub 148. Oilite hub 148 is a snug sliding fit on reel shaft 125, and the assembly, comprising ratchet pulley 150 and drag pulley 158, is mounted on the reel shaft so there is no end play of reel shaft 125 in oilite bearing 124 press fitted in the cylindrical boss 123 on reel shaft bracket 116. With the parts thus mounted, dowel set screw 159 is tightened to lock oilite hub 148 securely on reel shaft 125. A string 160 composed of material suitable to function as a friction band, is threaded through the slot in the lower end of link 143 and looped around pin 145. The loop is brought back over drag pulley 158 and wrapped once around the pulley, the two ends of the string passing on opposite sides of the loop before they are threaded through the holes in link 146. Before tying the ends of the string together, the loop is made of such length that coil spring 142 will be under slight tension when adjusting screw 140 is backed off to allow the swinging end of arm 138 to come close to drag bracket 131.

When action depicted on the film is being viewed in normal sequence, upper sprocket 12 (Figs. 1 and 5) acts as feed sprocket to supply film to the film loop above the aperature unit, and reel shaft 125 is rotated clockwise, as viewed in Fig. 6, by the pull applied to the film by upper feed sprocket 12. Under this condition of operation, a drag should be exerted on reel shaft 125 by drag bracket 131 through mechanism associated with the loop in string 160 acting as a friction band around drag pulley 158. This drag is just sufficient to prevent over running of reel 128 if projection is stopped suddenly when the projector is being operated at full speed. The loop, in string 160, anchored on link 146, acts as a brake band on drag pulley 158 and the drag pulley, when rotating clockwise (Fig. 6), amplifies the pull applied to that end of the loop connected to link 143. Thus slight tension on coil spring 142 will provide considerable drag on reel shaft 125. The driving effect of belt 16 has no influence in rotating reel shaft 125 in a clockwise direction (Fig. 6) because ratchet pulley 150 rotates freely in this direction on oilite hub 148.

When action depicted on the film is being viewed in reverse sequence, upper sprocket 12 (Figs. 1 and 5) acts as hold back sprocket to maintain the film loop above the aperture unit and, hence, feeds film to the upper reel. Under this condition of operation, upper reel shaft 125 must be driven counterclockwise (Fig. 6) to wind up film as it comes off upper sprocket 12. As soon as sprocket 12 begins turning counterclockwise, belt 16 drives ratchet pulley 150 in the same direction: ratchet pawls 152 engage ratchet teeth 148 and upper reel shaft 125 rotates with ratchet pulley 150. The drag of string 160 on drag pulley 158, when the pulley rotates counterclockwise, is insignificant since its maximum value is the slight pull exerted by coil spring 142.

The ratio of the diameters of the pulley groove in gear hub 15 and the pulley groove in ratchet pulley 150, is such that reel 128 will be driven just fast enough to take up film coming from sprocket 12 when the diameter of the wound mass of film on reel 128 is a minimum; i. e., when there is just one turn of film on reel hub 129. As the wound mass of film on the reel increases in diameter, reel 128 will naturally revolve progressively slower, therefore belt 16 is preferably made of a coiled spring and is tensioned sufficiently to drive the take up reel without creating undue strain on the edges of sprocket holes as film comes off sprocket 12. As film winds on the take up reel, belt 16 slips more and more on its pulleys. It is to be noted that the ratio of pulley diameters required for proper take up reel drive, is such that, when ratchet pulley 150 is driven clockwise by belt 16, the ratchet pulley will rotate at a slightly greater speed than the maximum speed at which reel shaft 125 rotates when film is being drawn from reel 128.

In my radar film assessor assembly, the lower reel shaft is journaled in an oilite bearing press fitted in the lower portion (not shown) of main frame 1. A drag bracket similar to drag bracket 131, but of the opposite hand, is seated on a rectangular finished boss on main frame 1 and is secured thereto by a screw. The lower reel shaft assembly is exactly the same, with one exception, as the upper reel shaft assembly, including ratchet pulley 150 and drag pulley 158; the exception being that the ratchet teeth are reversed and the pulley halves are assembled in reverse positions so that the ratchet pawls will function to drive the reel shaft in the opposite direction to that in which reel shaft 125 is driven by ratchet pulley 150.

The foregoing description relates to mechanism for feeding film continuously in either direction over an aperture plate. When feeding film in one direction only and at the normal sound film projection speed of 24 frames per second, the movement of film over a combined sound and picture aperture unit, or over a sound aperture, may be stabilized by using other and more simple devices for tensioning the film between the aperture film sprockets. In Fig. 10 is shown, schematically, a simple and effective differential arrangement for stabilizing film movement over a sound aperture unit either in an optical rectifying or in an intermittent motion picture projector. The same film feeding mechanism may be used also in sound recording devices. A cylindrical photo cell housing 161 (shown with cover removed) is suitably secured to the projector main frame (not shown) and carries fixed thereon curved aperture plate 162 containing the usual sound aperture. The aperture plate 162 is provided with raised hardened steel runners which make contact with the film only adjacent the perforations therein, so no contact is made with the film over picture and sound track areas. A photo cell 163 is suitably supported within housing 161 which is slotted to permit the scanning beam, transmitted through sound exciter tube 164, to enter the photo cell as indicated by broken lines. An upper film sprocket shaft 165, journaled in an oilite bushing suitably supported in the main frame, carries set screwed on one end, film sprocket 166 and on the other end, flanged pulley 167. A lower film sprocket shaft 168, exactly like shaft 165 and similarly supported, carries set screwed on one end, film sprocket 169 and on the other end flanged pulley 170. Film sprockets 166 and 169 are in alignment with each other and with the raised hardened steel runners on aperture plate 162. Flanged pulley 167 and 170 are in alignment and are alike except that pulley 167 is slightly larger in diameter than pulley 170, the differential being from 1 to 5 percent. Idler rollers 171 and 172, to retain film in proper engagement with sprockets 166 and 169, are suitably mounted so they may be withdrawn from the sprockets to permit easy threading of film through the sound head.

An endless belt 173, when mounted on flanged pulleys 167 and 170, has some slack which is taken up in the following manner: A swinging arm 174, pivotally mounted at one end on hinge pin 175 secured in the main frame, carries rotatably mounted on its swinging end, a flanged roller 176 which engages endless belt 173. A rectangular boss 177, projecting rearwardly from the main frame, has a threaded bore in which is screwed the oilite adjusting screw 178 having knurled head 179. Within the axial bore in oilite adjusting screw 178 slides freely a plunger 180, one end of which is rounded to enter the hemispherical seat in the side of swinging arm 174. A coiled compression spring 181 surrounds plunger 180 and seats at one end, against an integral flange on plunger 180 and at the other end, against the end of adjusting screw 178. By turning adjusting screw 178, tension on endless belt 173 may be regulated very accurately.

Power to move the film downwardly across the scanning beam is applied to lower sprocket shaft 168 by the gear train in the projector mechanism, through a suitable mechanical filter (not shown). A flywheel 182 is secured on lower sprocket shaft 168 so that feed sprocket 169 will rotate at constant angular velocity while the projector is in operation. Feed sprocket shaft 168 may be driven by any suitable means which will cause feed sprocket 169 to operate at constant angular velocity and will permit film to pass through the projector and sound head without damage.

To insure smooth passage of film through the sound head, the operation of film sprockets 166 and 169 must be free from any and all external disturbances such as may be caused by bent film reels, faulty feed and take up mechanism, etc. To this end, I have provided a combination feed and hold back sprocket 183 fixedly mounted on shaft 184 suitably journaled in an oilite bushing supported in the main frame of the projector. A gear 185 (indicated by pitch circle) secured on shaft 184 and positioned behind the main frame, is in line with an identical gear 186 secured on shaft 168. An idler gear 187, secured on shaft 188 suitably journaled in an oilite bushing in the main frame, is in alignment and meshes accurately with gears 185 and 186. In threading film through the sound head, free loops are formed in the film between sprocket 183 and sprocket 166, and between sprocket 183 and sprocket 169, as shown in Fig. 10.

Since flanged pulley 167 is larger (1 to 5 percent) in diameter than flanged pulley 170, it is obvious that endless belt 173 cannot drive film sprocket 166 as fast as film sprocket 169 is rotating, hence, when film is passing through the sound head, film sprocket 166 will actually be driven synchronously with sprocket 169 by the pull applied to the film by sprocket 169. Endless belt 173 provides a drag on sprocket 166 which is dependent on (1) the tension on endless belt 173 and (2) the differential in the diameters of flanged pulleys 167 and 170. Thus, accurate control of the tension on endless belt 173 provides an excellent means for regulating tension on film overlying the sound aperture plate. Another highly satisfactory method of applying a uniform and adjustable drag on sprocket shaft 165 is to use a drag pulley, a looped friction band and an adjustable tension spring in the manner hereinbefore described in connection with the drag mechanism on reel shaft 125. There are other and obvious means for applying an adjustable friction drag on sprocket shaft 165, and any means which will suitably tension the film between two film sprockets, the one above and the other below the aperture plate, will be effective as a film movement stabilizer, according to this invention.

*Initial assembly of revolving lens wheel projector*

When the projector mechanism and lens wheel are first assembled, sprocket 24 is mounted on shaft 20 in such angular position that, when a film is placed on sprocket 24 with the frame line positioned exactly opposite a frame line mark on the end of sprocket 24, a film frame will be exactly centered on the aperture plate and at the same time, a lens element 7 on lens wheel 6 will be exactly centered on the optical axis of front component 8 of the objective. This indexing of the aperture feed sprocket to the lens wheel is required to give projected images in frame on the screen. When film is engaged with feed sprocket 24 in indexed position as described, the projected image will always be in frame on the screen.

Also during the initial assembly, upper aperture sprocket 21 is turned on shaft 19 (Fig. 1) until the axis of gear 50 (Fig. 4) lies in the plane of the axes of aperture sprocket shafts 19 and 20 when a film, having average shrinkage (¾ percent), is properly tensioned over the aperture plate. Sprocket 21 is then secured to shaft 19 in this position by tightening set screw 22 (Fig. 2). This adjustment is made so the pitch circles of gears 50 and 23 will be substantially tangent under all film feeding conditions irrespective of the degree of shrinkage in the film being shown.

*Operation of the device*

The manner in which the various components of my device function, has been described in connection with the detail description of the elements of this invention. To thread film in my radar film assessor, reel 128 carrying film wound in the usual manner with the emulsion side out, is placed on reel shaft 125 and secured thereon. Operating handle 105 is raised up until it locks in top position, thereby swinging idler rollers 70 and 89 clear of all film sprockets and also turning upper aperture film sprocket 21 slightly in a counterclockwise direction so film may be threaded loosely over the teeth on all four film sprockets. Film is then drawn from reel 128 until film frames will reach part way around lower aperture feed sprocket 24 and the film is engaged with teeth on this sprocket so a frame line on the film is directly opposite one of the frame line marks on the end of sprocket 24. With the film thus engaged with sprocket 24, the film is pressed loosely against the aperture plate and engaged with teeth on sprocket 21, wrapped around idler roller 70 and engaged with teeth on upper feed sprocket 12 and any slack is wound back on reel 128. The film leader is wrapped around idler roller 89, engaged with teeth on sprocket 12a and the end is attached to the take up reel and the take up reel is turned to take up the film slack.

When film is thus threaded over the sprockets, a slight pull on finger grip 112 (Fig. 3) withdraws plunger 111 from the bore in the edge of main frame 1, thereby releasing operating handle 105 which returns to its lowest position. Idler rollers 70 and 89, under the influence of coiled springs 85, are returned to engagement with their respective sprockets and upper aperture sprocket is rotated clockwise under the influence of coil spring 55, to tension properly the film overlying the aperture plate. The film feeding mechanism is now ready for operation and turning the hand crank in one direction will cause film to move smoothly and downwardly over the aperture plate. After some film has been wound on the lower reel, turning the hand crank in the reverse direction will cause film to move smoothly and upwardly over the aperture plate. Thus, the hand crank may be turned in either direction and at any desired rate to move film frames over the aperture plate in any manner required for thorough analysis of the action as recorded on the film.

For critical analysis of action, frame by frame, by means of the dissolve transition between successive film frames, it is advantageous to extend lower aperture sprocket shaft 20 beyond the helical gear 29 so a suitable hand wheel may be fixedly mounted beyond gear 29. By manually operating this hand wheel, film frames may be moved very slowly over the aperture plate and film movement may be stopped when a frame line on the film is exactly centered on the aperture plate; i. e., when a pair of film frames are centered on the optical axis of front component 8. When two film frames are thus centered on the optical axis, the line between two rear components 7 on lens wheel 6 will also be centered on the optical axis of front component 8, and the screen image will be composed of the images of two adjacent film frames superimposed in exact registration and each film frame will be supplying exactly one half of the illumination on the screen. This particular and exact positioning of film frames and revolving lens wheel components, provides the ideal means for determining precisely the relative displacements of moving objects during the interval between successive film frame exposures in the camera. The revolving lens wheel objective system provides the high image resolution and the distortion free images which are essential to this type of frame by frame analysis.

The film feeding mechanism and revolving lens wheel optical rectifying objective hereinbefore described are well suited for use as (1) radar film assessor, (2) research film viewer for analyzing action as recorded sequentially on motion picture film, (3) projector for integrating, on the surface of the screen, and in true color, the action recorded on the film, (4) television film scanner in association with storage or non storage camera tubes, (5) television film scanner in association with flying spot scanning tubes, especially for color.

The aperture film feeding mechanism and the revolving lens wheel objective system, as hereinbefore described, may be adapted for use in cameras by enclosing the device in a light tight case, modifying the feed and hold back sprocket arrangement, and supplying suitable light tight film magazines. Such cameras, operating 100 percent shutter free, are most advantageous for (1) kinescope recording, especially in color, (2) reconnaissance photography, (3) high speed photography and (4) all branches of motion photography wherein smoothness of action and full exposure, under ordinarily inadequate illumination, are required. The aperture forward and reverse film feeding mechanism is of special advantage in cameras used in trick photography.

Other applications and uses for the revolving lens wheel optical rectifying objective in combination with my improved film feeding mechanism, may and probably will occur to those skilled in the arts of photography, projection and television. The claims which follow are intended to cover this invention and all practical uses to which it may be put in projection, in photography and in television.

Having thus fully described my invention, what I claim is:

1. In a device of the character specified having an aperture unit including a curved aperture plate, an aperture film feeding mechanism comprising a pair of rotatably mounted film sprockets, one, a feed sprocket, positioned below, and the other, a drag sprocket, positioned above said aperture unit, means for driving said feed sprocket at uniform angular velocity to advance film over said aperture plate, gear means, including a swingable gear linkage, for driving said drag sprocket from said feed sprocket, and resilient adjustable means for variously positioning said swingable gear linkage to tension the film overlying said curved aperture plate as film moves smoothly thereover under the influence of said sprockets.

2. In combination with an aperture unit having a curved aperture plate, an aperture film feeding mechanism comprising a pair of sprocket shafts rotatably mounted, the one above and the other below said aperture unit, a film sprocket fixedly mounted on one end of each of said sprocket shafts in alignment with said curved aperture plate, one of a pair of identical gears fixedly mounted in alignment on each of said sprocket shafts, means for driving one of said shafts, an arm swingably mounted about the axis of one of said sprocket shafts and carrying rotatably mounted at one end a gear in alignment, and adapted and arranged to mesh accurately, with said identical pair of gears, means for swinging said arm in one direction, means for releasably locking said arm in extreme position, and adjustable resilient means arranged to swing said arm in the other direction for the purpose of variously tensioning the film overlying said aperture plate, when film is standing still thereon or moving in one direction thereover.

3. The combination of aperture unit and aperture film feeding mechanism, as in claim 2, plus means acting on said arm so either of said film sprockets may function as feed sprocket while the other acts as drag sprocket to maintain substantially constant tension on the film overlying the aperture plate as film is actuated thereover in either direction by the rotation of said sprockets.

4. The combination of aperture unit and aperture film feeding mechanism, as in claim 2, plus means adapted and arranged to act on said arm so the tension on the film overlying the aperture plate will be substantially the same irrespective of the direction in which film is moving thereover.

5. The combination of aperture unit and aperture forward and reverse film feeding mechanism, as in claim 4, plus a counterbalance on said arm so the tension on the film overlying the aperture plate will be substantially constant irrespective of the angle at which the aperture unit and aperture film feeding mechanism are tilted in operation.

6. In association with an aperture film feeding device for tensioning film between two film sprockets, means for driving one of said sprockets, an angularly adjustable counterbalanced swinging arm and associated gear means adapted and arranged to drive the other of said sprockets from the driven sprocket, adjustable resilient means connected with said arm to variously position said associated gear means to tension the film between said sprockets, and a second adjustable resilient means connected to said arm through a one way force multiplier to provide constant film tension irrespective of the direction or the rate of rotation of said sprockets.

7. In an optical rectifying device including an aperture unit having a curved aperture plate, an aperture film feeding mechanism comprising a pair of rotatable film sprockets in alignment with said aperture plate, one, a feed sprocket, positioned below, and the other, a drag sprocket, positioned above said aperture unit, means for driving said feed sprocket to advance film frames over said aperture plate in synchronism with the movement of the optical rectifying elements, an angularly adjustable swinging arm and associated gear means adapted and arranged to drive said drag sprocket from said feed sprocket, and adjustable resilient means connected with said angularly adjustable arm to variously position said associated gear means to tension the film overlying said curved aperture plate as film is fed smoothly thereover by rotation of said sprockets.

8. In an optical rectifying device including an aperture unit having a curved aperture plate, an aperture film feeding mechanism, as in claim 7, plus means acting on said angularly adjustable arm so said film sprockets may function interchangeably as feed sprocket or drag sprocket, to tension, uniformly, film overlying the aperture plate, irrespective of the direction or the rate at which film is moving thereover.

9. In a continuous film feeding mechanism, the combination of an aperture unit having a curved aperture plate, a pair of aperture film sprockets, a swingable arm carrying a gear meshing with gears associated with said aperture film sprockets and arranged to rotate one of said sprockets slightly with respect to the other as said arm is swung through a small angle, adjustable spring means arranged to resist motion of said arm in one direction for the purpose of tensioning film overlying said curved aperture plate, an upper feed sprocket, a lower hold back sprocket, means for rotating all of said sprockets simultaneously, a pair of idler rollers adapted and arranged to retain film in engagement with all four of said sprockets, swingable means for supporting said idler rollers, resilient means for retaining said idler rollers in engagement with film threaded over said sprockets, means for (1) shifting said swingable means so said idler rollers will clear said sprockets and be in position to act as film loop setters, and (2) swinging simultaneously said swingable arm so film may be threaded loosely over the teeth on said aperture film sprockets, and releasable locking means for retaining said idler rollers and said aperture film sprockets in film threading position.

10. In a continuous film feeding mechanism, the combination, as in claim 9, plus means, including an adjustable tension spring and a one way force multiplier, acting on said swingable arm so said aperture film sprockets may function interchangeably, as feed sprocket or drag sprocket to tension, uniformly, film overlying the aperture plate, irrespective of the direction or the rate at which film is moving thereover.

11. In a device of the character specified having an aperture unit including a curved aperture plate, an aperture film feeding mechanism comprising a pair of rotatably mounted film sprockets, one, a feed sprocket, positioned below, and the other, a drag sprocket, positioned above said aperture unit, means for driving said feed sprocket at uniform angular velocity to advance film over said aperture plate, means other than the film, including a swingable gear linkage, for driving said drag sprocket from said feed sprocket, and adjustable means, acting upon said swingable gear linkage, adapted and arranged to variously tension the film overlying said curved aperture plate as film is fed smoothly thereover by rotation of said sprockets.

12. In a device; such as an optical rectifying projector or camera, and a sound pick up or recorder, wherein film may be required to remain stationary on, move in either direction and/or continuously over, an aperture unit having a curved aperture plate; a complete film feeding mechanism including, aperture film feeding means, including two film sprockets interconnected by a swingable gear linkage adapted and arranged to constrain film to conform to the curvature of the aperture plate by continuously tensioning the film lying thereover, sprocket means for retaining free loops in the film as it approaches and leaves said aperture film feeding means, and a pair of reel shaft assemblies, each including a one way drag means and a one way (reverse) drive means, adapted and arranged to coact with said aperture film feeding means and with said means for retaining free loops in the film, (1) to prevent overrunning of the reel when film is being drawn therefrom, and (2) to wind film back on the reel, depending on the direction in which film is moving over the aperture plate in said device.

13. In a device wherein film may be required to remain stationary on or move continuously in either direction over an aperture unit, the combination of an optical rectifying means including an aperture unit having a curved aperture plate, an aperture film feeding means, including a film sprocket controlled by a swingable gear linkage from a second film sprocket, and adapted and arranged to constrain film to conform to the curvature of said aperture plate by continuously and uniformly tensioning the film lying thereover, sprocket means for maintaining free loops in the film as it approaches and leaves said aperture film feeding means, and a pair of reel shaft assemblies, each including automatically reversible drag and drive means, adapted and arranged to coact with said aperture film feeding means and with said means for retaining free loops in the film, to permit safe passage of film through said device at any speed up to normal and in either direction, from a film wound on reels and mounted on the reel shafts of said reel shaft assemblies.

References Cited in the file of this patent

UNITED STATES PATENTS

| | | |
|---|---|---|
| 1,271,623 | Segal | July 9, 1918 |
| 1,344,896 | Jobke | June 29, 1920 |
| 1,351,814 | Uhlemann | Sept. 7, 1920 |
| 1,944,035 | Proctor | Jan. 16, 1934 |
| 2,008,973 | Tuttle | July 23, 1935 |
| 2,280,825 | Holman | Apr. 28, 1942 |
| 2,323,513 | Bamford | July 6, 1943 |
| 2,326,654 | Jagust | Aug. 10, 1943 |
| 2,345,602 | Holman | Apr. 4, 1944 |
| 2,379,690 | Cunningham | July 3, 1945 |
| 2,384,637 | Owens | Sept. 11, 1945 |
| 2,396,243 | Boisselier | Mar. 12, 1946 |
| 2,410,711 | Canady | Nov. 5, 1946 |
| 2,466,411 | Geradin | Apr. 5, 1949 |
| 2,530,448 | Boecking | Nov. 21, 1950 |